United States Patent
Gaufin (10) Patent No.: US 9,050,958 B2
(45) Date of Patent: Jun. 9, 2015

(54) PNEUMATIC BRAKE ACTUATOR CHAMBER WITH ROTATIONALLY POSITIONABLE HOUSING

(75) Inventor: Carl Gaufin, Hanceville, AL (US)

(73) Assignee: TSE Brakes, Inc., Cullman, AL (US)

(*) Notice: Subject to any disclaimer, the term of this patent is extended or adjusted under 35 U.S.C. 154(b) by 207 days.

(21) Appl. No.: 13/493,570

(22) Filed: Jun. 11, 2012

(65) Prior Publication Data
US 2013/0327209 A1  Dec. 12, 2013

(51) Int. Cl.
*F16D 65/00* (2006.01)
*B60T 17/08* (2006.01)
*F16D 65/28* (2006.01)
*F16D 121/08* (2012.01)
*F16D 121/10* (2012.01)
*F16D 123/00* (2012.01)

(52) U.S. Cl.
CPC .......... *B60T 17/088* (2013.01); *Y10T 29/49826* (2013.01); *F16D 65/28* (2013.01); *F16D 2121/08* (2013.01); *F16D 2121/10* (2013.01); *F16D 2123/00* (2013.01)

(58) Field of Classification Search
USPC ......... 188/153 D, 153 A, 265, 166, 167, 170; 303/89, 9.76, 71; 92/96, 98 R, 128
See application file for complete search history.

(56) References Cited

U.S. PATENT DOCUMENTS

| 5,016,523 A | 5/1991 | Bowyer |
| 5,193,432 A | 3/1993 | Smith |
| 5,315,918 A | 5/1994 | Pierce |
| 6,526,866 B2* | 3/2003 | Pisoni et al. .................. 92/98 R |
| 2002/0148351 A1 | 10/2002 | Anderson et al. |
| 2007/0017757 A1* | 1/2007 | Schrader et al. .............. 188/170 |
| 2007/0035177 A1* | 2/2007 | Thompson et al. ........ 303/115.1 |
| 2008/0041672 A1* | 2/2008 | Anooshian et al. .......... 188/170 |

FOREIGN PATENT DOCUMENTS

DE   3344622   6/1985

OTHER PUBLICATIONS

English translation of DE 3344622 published Jun. 20, 1985.
European Search Report from corresponding EP Application No. 13171269.7 dated Oct. 18, 2013.

* cited by examiner

*Primary Examiner* — Robert A Siconolfi
*Assistant Examiner* — Vu Q Nguyen
(74) *Attorney, Agent, or Firm* — DLA Piper LLP (US); R. Blake Johnston (57) ABSTRACT

A rotationally adjustable brake actuator includes a pressure housing with a circumferential rim, a non-pressure housing having a second circumferential rim, and a diaphragm disposed therebetween, where a retaining ring holds the respective housings against each other such that the first rim abuts the second rim, but where the respective housings are able to be rotated with respect to the other. Further, the retaining ring includes a radially-oriented hole and a stop pin that is inserted into the hole and engages the pressure housing to prevent further rotation.

34 Claims, 7 Drawing Sheets

PNEUMATIC BRAKE ACTUATOR CHAMBER WITH ROTATIONALLY POSITIONABLE HOUSING

BACKGROUND

1. Field

This invention relates to pneumatically operated spring brake actuators and in particular to brake actuators having a rotationally positionable pneumatic chamber assembly for installation in a variety of vehicles.

2. Description of the Problem and Related Art

Conventional brake actuators are used commonly on commercial vehicles like trucks and buses as the apparatus to apply the force needed to create a braking event. These actuators can be divided into two portions.

The first portion is dedicated to in motion braking and is commonly called the "service side." It is typically made up of a metal plate formed into a bowl-shaped chamber with a central hole for an actuating rod to pass through and two or more mounting studs being either welded or press fit into the base. These mounting studs are then bolted onto the mounting bracket of the vehicle axle or caliper. The rim of the chamber may be formed to include an annular shoulder to provide a seat against which a diaphragm and a central flange that divides the two portions of the brake chamber is fitted to form a fluid seal. This central flange includes pneumatic ports for the supply of air to operate both portions of the actuator. The central flange, diaphragm and lower metal mounting housing are typically sealed together via a mechanical clamping device or a metal forming process that compresses the diaphragm between the center flange and the rim of the first portion. When this occurs, the radial position of the pneumatic supply ports with respect to the mounting studs is fixed.

The second portion of these chambers is dedicated to applying the braking force while the vehicle is at rest and consists of a large power spring that acts as an emergency parking brake, sometimes referred to as the "non-service side." There are two main ways that the spring is compressed. One is by the use of a diaphragm that presses on a plate touching the spring and another is similar to the design of a pneumatic cylinder. This power spring is seated between a pressure plate (or piston cup depending on design) and a back plate that in one fashion or another serves as the resistive load base for the spring. This spring plate can be fastened to the central flange in many ways including metal forming, welding and mechanical clamping.

Thus, when the brake is mounted to the vehicle, the pneumatic ports may be positioned where it is difficult or impractical to connect air conduits to the pneumatic ports. In other words, different vehicles require different orientations of the mounting studs with respect to the pneumatic ports because the locations of pneumatic conduit connections are not standard and vary widely from vehicle to vehicle according to the vehicle designer's needs.

Manufacturers of brake actuators have addressed this issue by producing specific actuator configurations for specific vehicles which increases cost as a direct result of increased production lines, material, personnel and process steps. Another solution is proposed in U.S. Pat. No. 5,016,523 to Bowyer, in which the mounting bolts are attached to a mounting plate which is loosely placed on the bottom inside the end of the actuator and overlays a circular opening defined the bottom wall through which the mounting bolts extend. Thus, the bolts may be attached to the vehicle and the actuator may be rotationally positioned.

SUMMARY

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

A rotationally adjustable brake actuator includes a pressure housing having a first circumferential opening defined by a first rim, a non-pressure housing having a second circumferential opening defined by a second circumferential rim, and a diaphragm disposed therebetween thereby defining two interior chambers that are sealed in relation to one another. A retaining ring defines an annular channel that encloses at least the first rim and retains the first rim against said second rim. An exterior radially-oriented hole is defined in the retaining ring and is dimensioned to receive a stop pin that fixes angular position of the respective housings in relation to the other upon installation on a vehicle. Preferably, the first rim is shaped to define an interior circumferential channel for receiving and retaining a circumferential edge of the diaphragm.

In one embodiment, the first rim includes a plurality of interior radially-oriented holes that may be aligned with the exterior hole such that the stop pin may be inserted into the exterior hole and any one of the interior holes to fix the angular positions of the housings in relation to each other.

In another embodiment, the stop pin is biased against unintended disengagement from the hole(s).

In yet another embodiment, the retaining ring is formed integrally with the second rim of the non-pressure housing.

Other exemplary embodiments will also become readily apparent to those skilled in the art from the following detailed description with reference to the attached figures.

BRIEF DESCRIPTION OF THE DRAWINGS

The present invention is described with reference to the accompanying drawings. In the drawings, like reference numbers indicate identical or functionally similar elements.

DETAILED DESCRIPTION

The various embodiments of the present invention and their advantages are best understood by referring to FIGS. 1 through 5 of the drawings. The elements of the drawings are not necessarily to scale, emphasis instead being placed upon clearly illustrating the principles of the invention.

Reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

Figure 1:
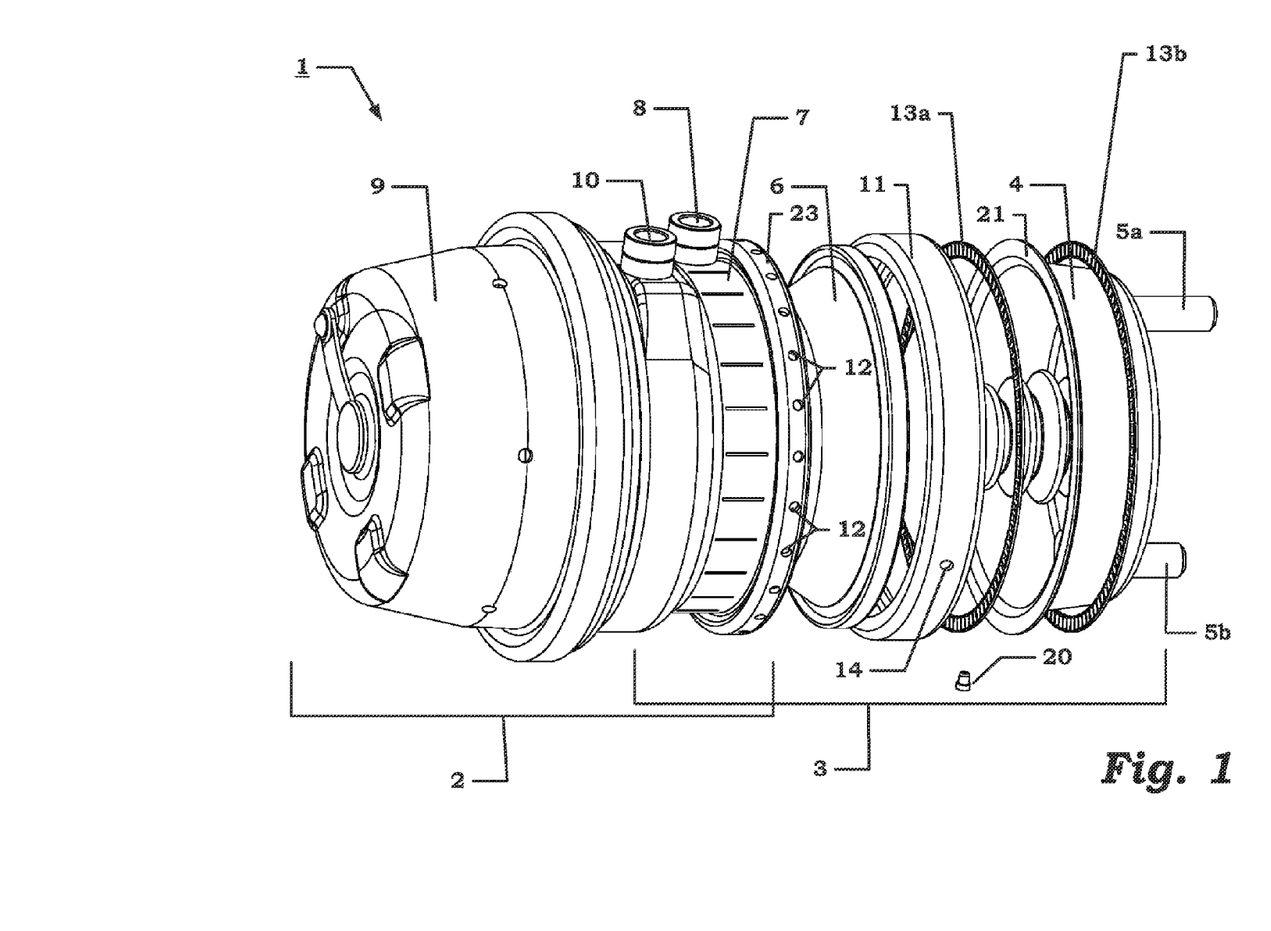
FIG. 1 is a partially exploded diagram of an exemplary brake actuator adapted for rotational adjustment.
Figure 2:
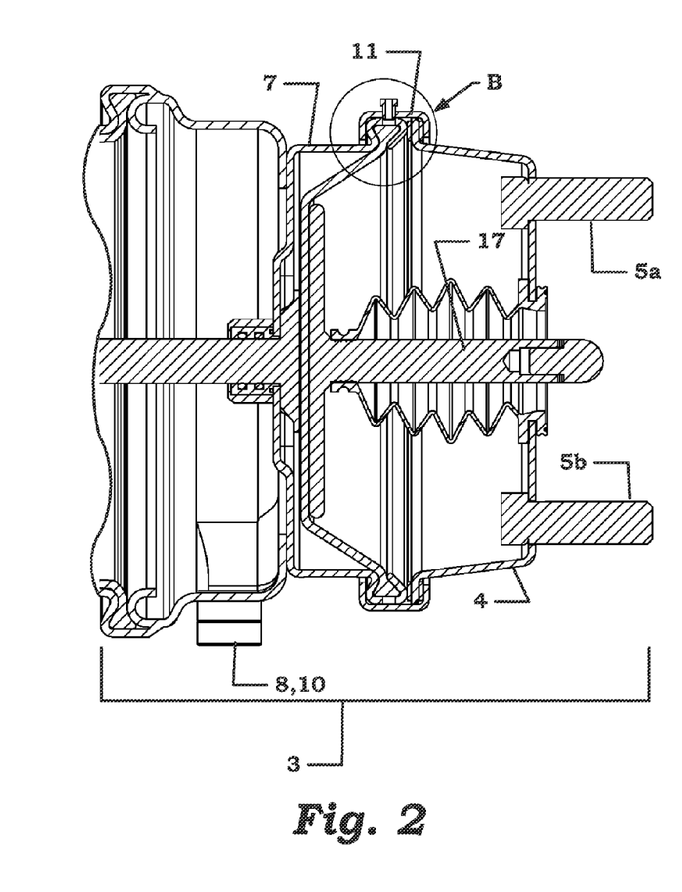
FIG. 2 is a section view of the service side of the exemplary brake actuator of FIG. 1.
Figure 2B:
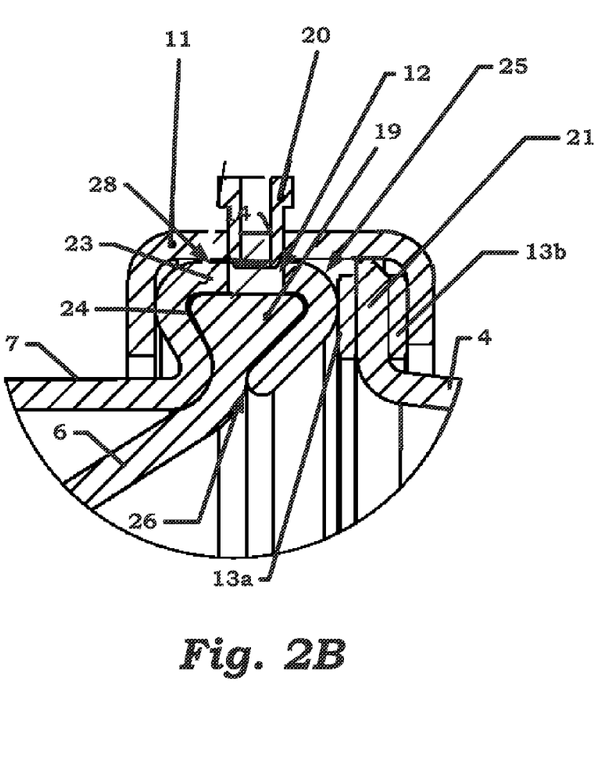
FIG. 2B is a detailed inset of the seating of the two housings of the actuator illustrated in FIG. 2.

A first exemplary embodiment of an adjustable brake actuator is illustrated in the accompanying FIGS. 1, 2 & 2B. This embodiment includes a parking/emergency brake side 2 coupled to a service brake side 3. The service brake side 3 comprises a service non-pressure housing 4 having a generally cylindrical or frustoconical shape and mounting bolts 5a, 5b extending therefrom for mounting to a vehicle. A diaphragm 6 is interposed between the opening of the service non-pressure housing 4 and a service pressure housing 7. The pressure housing 7 includes a service port 8 to which is coupled a pneumatic conduit (not shown) to supply air for service brake operation. The service pressure housing 7 is in turn coupled to the a spring housing 9 for the parking/emergency brake side 2 and also includes a service port 10 that provides a supply air for parking brake operations when connected to a pneumatic conduit (not shown). The non-pressure housing 4 is clamped to the pressure housing 7 with a retaining ring 11 that includes an aperture 14 for receiving the insertion of a stop pin 20. Both housings are fitted with a push rod 17 (FIG. 2) which is moved to accomplish desired braking functions and which generally defines a longitudinal axis of the actuator 10.

As can be better perceived with reference to FIGS. 2 and 2B, in this embodiment the non-pressure housing 4 is formed to have a radially outward extending annular flange 21 while the pressure housing 7 is formed such that its open end, i.e., the end that mates with the non-pressure housing 4, comprises an annular band 23 that is rolled to define circumferential channel or slot 24 into which the circumferential rim 19 of the diaphragm 6 is inserted as shown in FIG. 2B. The circumferential channel 24 is configured, preferably, to comprise a narrow opening 26 and the circumferential rim 19 includes a thickness greater than the narrow opening 26, such that once the rim 19 is inserted into the channel 24, the rim 19 prevented from being pulled out through the opening 26 during use and is retained within the channel. The annular band 23, therefore, is rolled to compress and retain the circumferential rim 19 of the diaphragm to provide a fluid seal between the non-pressure housing 4 and the pressure housing 7.

Figure 5:
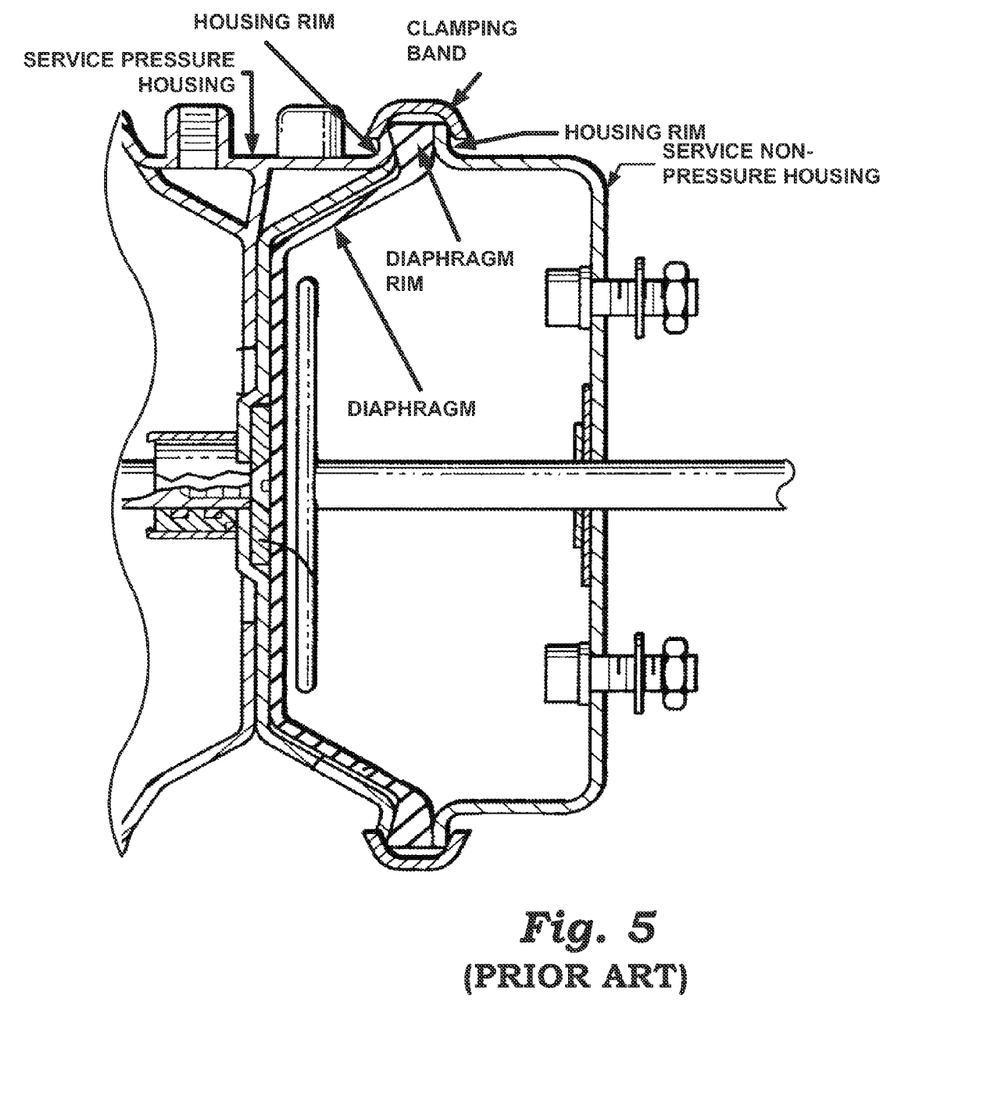
FIG. 5 is a section view of a typical prior art actuator service side housing configuration illustrating conventional arrangement of the diaphragm vis-a-vis the non-pressure housing and the pressure housing.

It will be appreciated that this configuration differs significantly from the prior art, as illustrated in FIG. 5. Indeed, in the prior art, the diaphragm is installed such that the circumferential edge thereof is interposed between the rim of the service non-pressure housing and the rim of the service pressure housing. The diaphragm is typically held in place by clamping the two opposing housing rims together with a clamping band.

The annular band 23 may also comprise a circumferential shoulder 25 that seats against the flange 21 when the two housings 4, 7 are mated together. Additionally, it may be advantageous in this embodiment to include a circumferential bearing 13a interposed between the annular flange 21 and the circumferential shoulder 25 to reduce metal-to-metal contact during rotational adjustment as described below, and after installation when the actuator is subjected to vibrations and other stresses. Optionally, a second circumferential bearing 13b may be interposed between the other side of the annular flange 21 and the retaining ring 11 for the same reasons.

The annular band 23 further comprises a plurality of radial holes 12 (FIG. 1) spaced along its circumference. As shown in the detailed inset of FIG. 2B, the pin 20 may be inserted thorough the aperture in the clamp band 11 and through a hole 12 in the annular band 23 of the pressure housing 7. Accordingly, it is desirable that corresponding holes are dimensioned to snugly receive insertion of the pin 20.

Prior to installation of the actuator 1 in a vehicle, the annular flange 21 of the non-pressure housing 4 and the annular band 23 of the pressure housing 7 are seated within the retaining ring 11, which is shaped to provide a radially inward-opening channel 28 for receiving the annular flange and the annular band 23. However, the angular position of the two housings with respect to each other is not fixed, but may be adjusted as required to accommodate various vehicle service port configurations. In other words, the non-pressure housing 4 may thus rotate with respect to the rest of the actuator, and vice-versa, within the channel 28 defined by the retaining ring 11.

Thus, when the actuator is to be installed, the pneumatic ports 8, 10 may be first connected to the air supply lines, and then the non-pressure housing 4 rotated about the longitudinal axis to align the mounting bolts for securing to vehicle as required. Alternatively, the mounting bolts are secured to the vehicle, thus fixing the angular position of the non-pressure housing 4, but since the remainder of the actuator may be rotated independently of the non-pressure housing 4, the pneumatic ports may be brought to the desired angular position and connected. When the mounting bolts 5a, b, and the pneumatic ports are secured and connected, the pin 20 may then be inserted in through hole in the retaining ring 11 and through one of the holes 12 in the pressure housing annular band 23 to fix the respective angular positions of each component.

Figure 6:
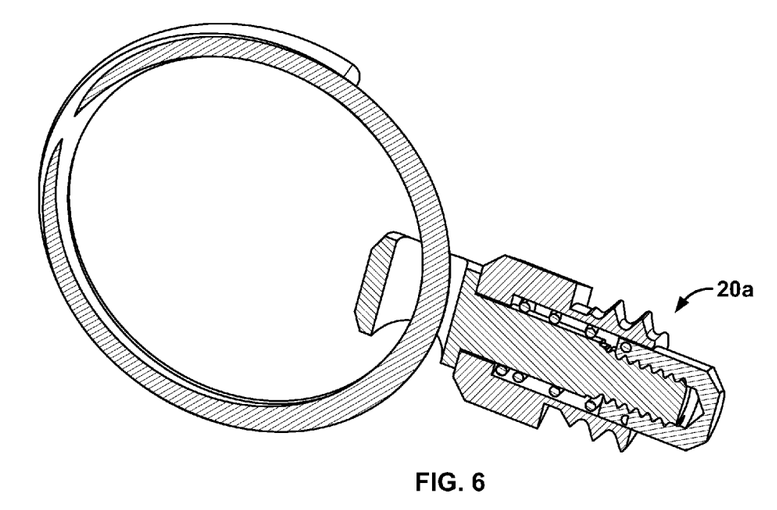
FIG. 6 is a section view of a spring-loaded pin.
Figure 7:
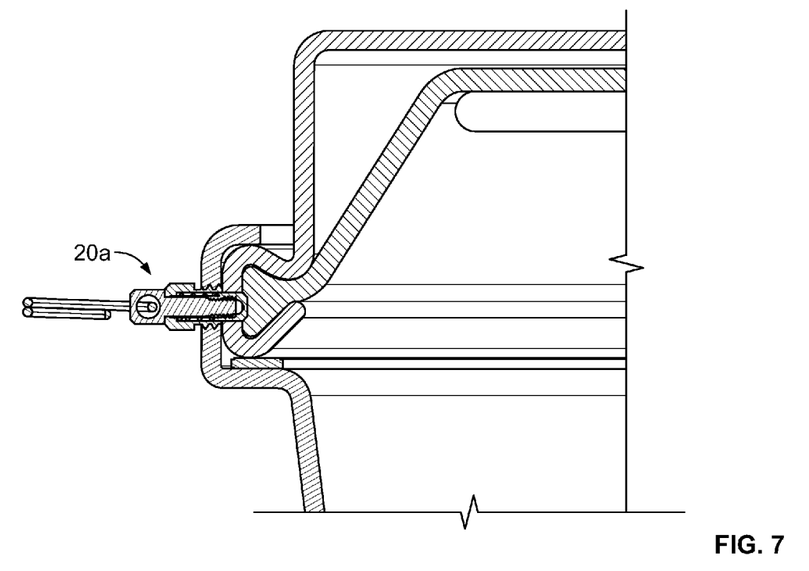
FIG. 7 is a detailed section view of the spring-loaded pin of FIG. 6 inserted into the aperture of the retaining ring of the non-pressure housing and a hole of the annular band of the pressure housing of FIGS. 3-4B.
Figure 8:
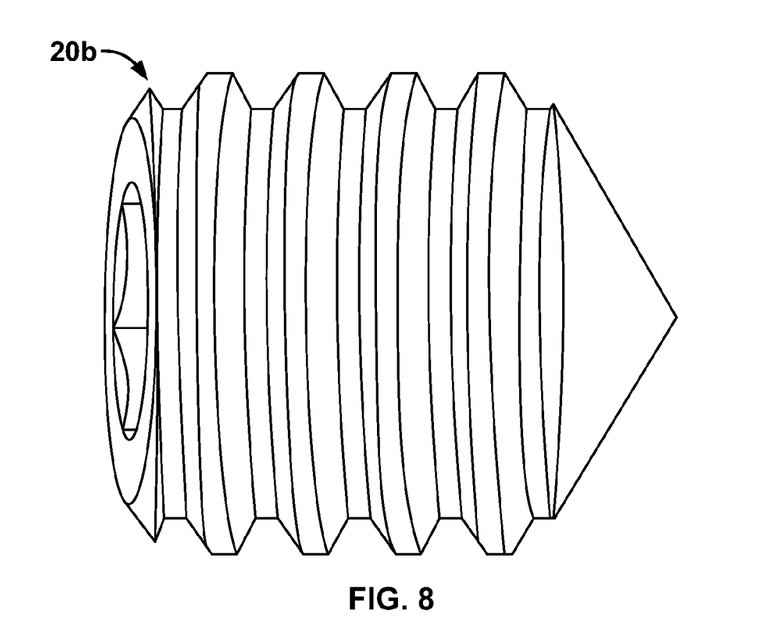
FIG. 8 is a perspective view of a set screw.
Figure 9:
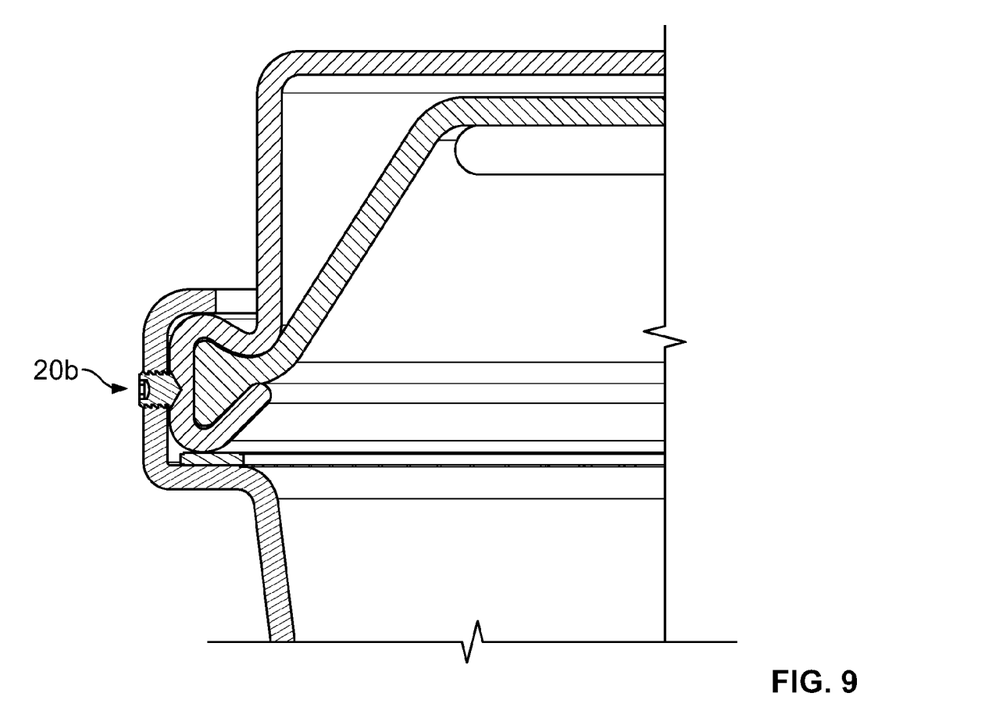
FIG. 9 is a detailed section view of the set screw of FIG. 8 inserted into the aperture of the retaining ring of the non-pressure housing and a hole of the annular band of the pressure housing of FIGS. 3-4B.

Preferably, the pin 20 of FIGS. 1, 2B, 3, 4 and 4B is a spring-loaded latching pin, as illustrated at 20a in FIGS. 6 and 7, biased radially inward to prevent unintended disengagement of the pin, and fixedly mounted within the aperture 14. Alternatively, the pin 20 may be removable, and it may include a spring loaded detent pin located near the inserted end that engages the inner edge of the hole 12, again, to prevent unintended disengagement. As a further alternative, the pin 20 may be a screw, as illustrated at 20b in FIGS. 8 and 9, and screwed in through the retaining ring 11 to fix the angular position of the two components. In this option, the annular band 23 does not need holes 12 to receive the screw as the pressure exerted by the screw will stop rotation.

Figure 3:
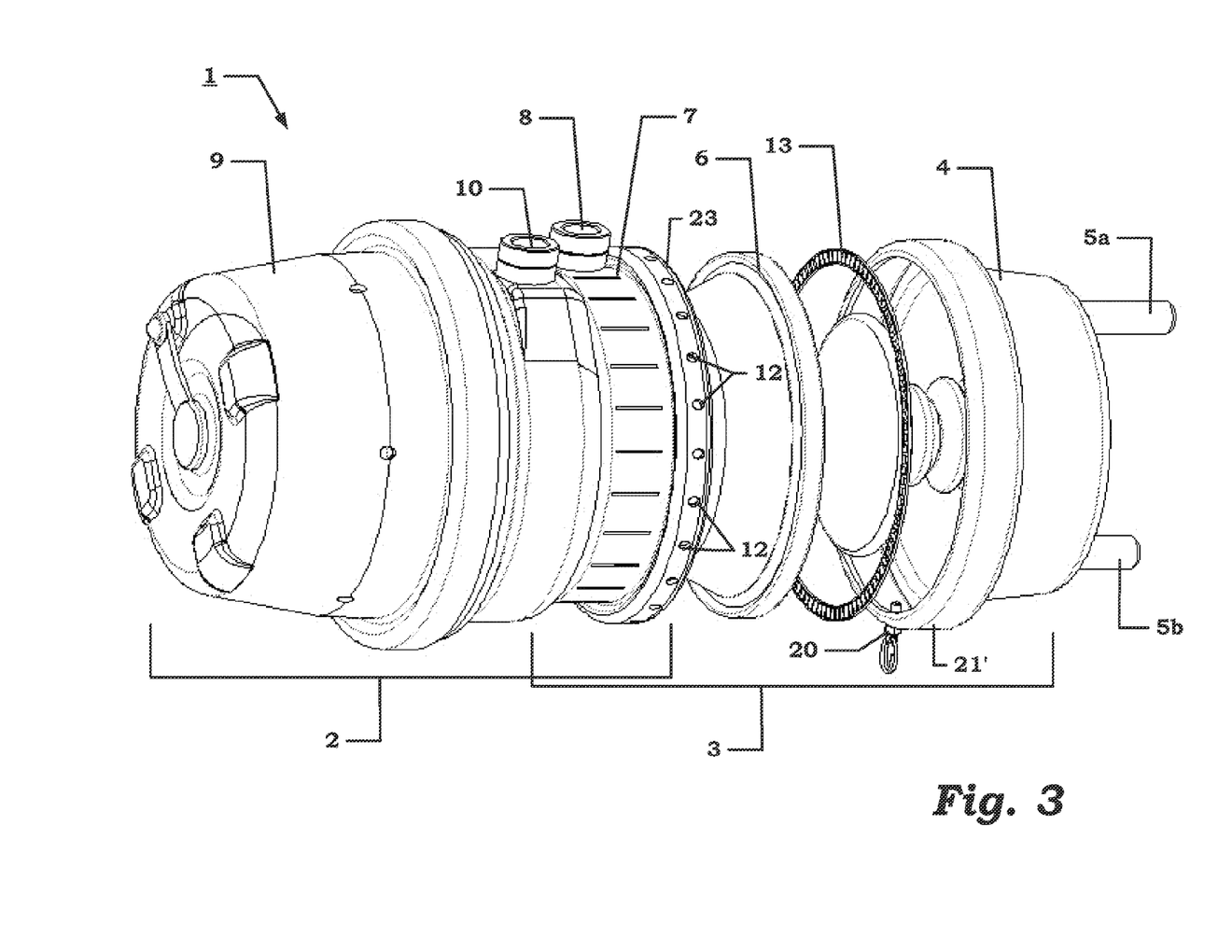
FIG. 3 is partially exploded diagram of another exemplary embodiment of a brake actuator adapted for rotational adjustment.
Figure 4:
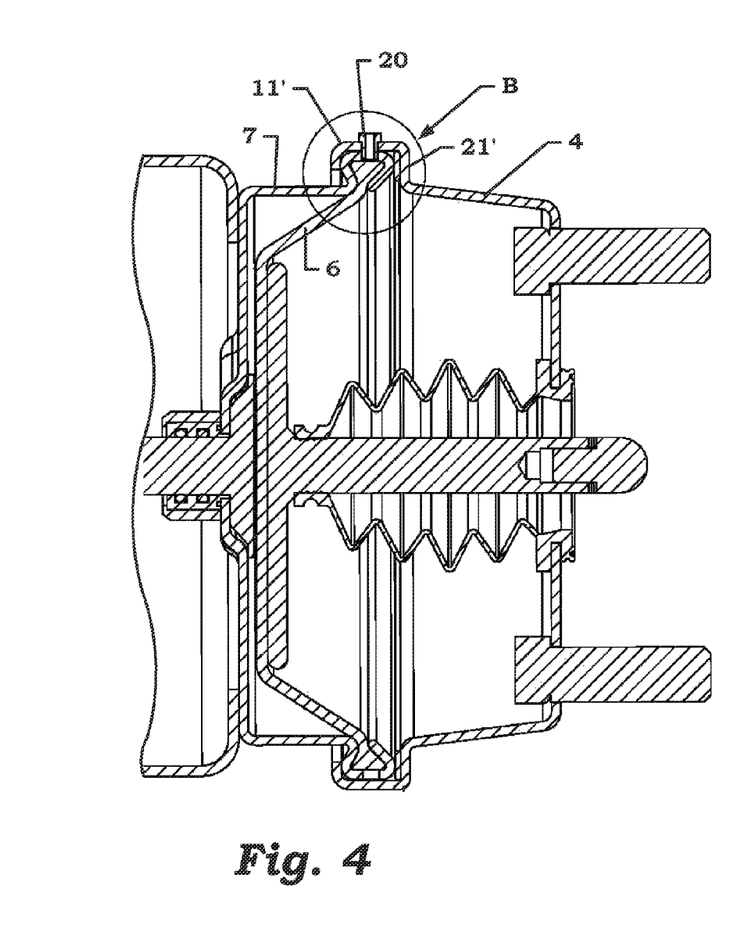
FIG. 4 is a section view of the brake actuator of FIG. 3.
Figure 4B:
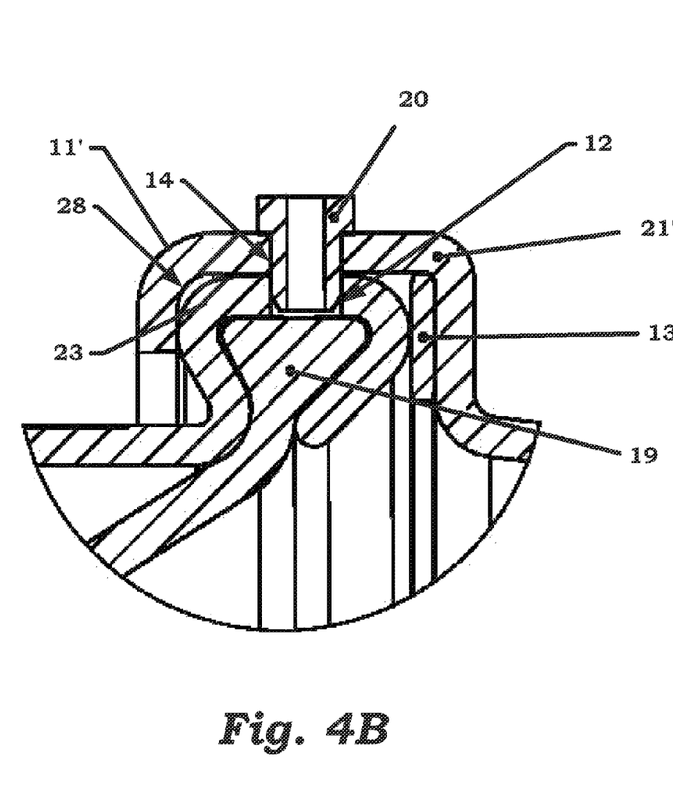
FIG. 4B is a detailed inset of the seating of the two housings of the actuator.

Another embodiment of a proposed rotationally adjustable brake actuator is shown in FIGS. 3, 4 & 4B. In this variation, the non-pressure housing 4 comprises and annular flange 21' that is shaped to provide an integral retaining ring 11' extending from the flange 21' and defining a radially inward-opening channel 28 into which the annular band 23 of the pressure housing 7 is received. As in the embodiment described above, the annular band 23 is seated upon the interior surface of the annular flange 21' and a circumferential bearing 13 may be interposed between the annular band 23 and the interior surface of the annular flange 21'. The annular flange 21' includes an aperture 14 for receiving the stop pin 20. Installation and adjustment of the actuator housing 1 is as described above, except that the non-pressure housing 4 and the integral retaining ring 11' are rotated together and independently of the remainder of the actuator assembly.

As described above and shown in the associated drawings, the present invention comprises a pneumatic brake actuator with rotationally adjustable housing. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A brake actuator for pneumatically actuated vehicle brakes, said actuator comprising:
    a non-pressure housing having one of a generally cylindrical and a generally frustoconical shape and comprising mounting fasteners for mounting said actuator to a vehicle, said fasteners extending from one end of said non-pressure housing, and an open end defined by a first annular rim;
    a pressure housing having an open end defined by a second annular rim, said second annular rim seated on said first annular rim;
    a diaphragm comprising a circumferential rim having a diaphragm circumferential rim thickness;
    said second annular rim defining a circumferential channel independently of the first annular rim, said circumferential channel having a radially inward-opening slot, said diaphragm circumferential rim positioned within the circumferential channel and the diaphragm circumferential rim thickness being greater than a width of the radially inward-opening slot so that the circumferential rim is prevented from being pulled through the inward-opening slot during use and is compressed within said circumferential channel so as to form a fluid seal;
    a retaining ring defining an annular channel enclosing said second annular rim and retaining said second annular rim against said first annular rim
    and preventing rotation of said first or second housing with respect to the opposing housing.

2. The brake actuator of claim 1, wherein said second annular rim is formed to comprise an annular band having a circumferential wall, said wall comprising a plurality of radially oriented holes, and wherein said retaining ring includes a radially-oriented hole and further comprising a pin inserted into the radially-oriented hole of the retaining ring and one of said plurality of holes of the second annular rim.

3. The brake actuator of claim 2, wherein said pin is one of a spring-loaded pin and a set screw.

4. The brake actuator of claim 1 wherein said retaining ring includes a radially-oriented hole and further comprising a pin inserted into the radially-oriented hole of the retaining ring and positioned in engagement with the second annular rim.

5. The brake actuator of claim 4, wherein said pin is a set screw.

6. The brake actuator of claim 1, wherein said first annular rim integrally comprises said retaining ring.

7. The brake actuator of claim 6, wherein said second annular rim is formed to comprise an annular band having a circumferential wall, said wall comprising a plurality of radially-oriented holes, and wherein said retaining ring includes a radially-oriented hole and further comprising a pin inserted into the radially-oriented hole of the retaining ring and one of said plurality of holes of the second annular rim.

8. The brake actuator of claim 7, wherein said pin is one of a spring-loaded pin and a set screw.

9. The brake actuator of claim 1 wherein said retaining ring is adapted to receive a pin.

10. The brake actuator of claim 9 wherein the retaining ring includes a hole adapted to receive a pin.

11. A rotationally adjustable brake actuator assembly, said assembly comprising:
    a pressure housing having a first circumferential opening defined by a first circumferential rim, said first circumferential rim independently defining a circumferential channel, said circumferential channel having a radially inward-opening slot having a width;
    a non-pressure housing having a second circumferential opening defined by a second circumferential rim;
    a diaphragm comprising a diaphragm circumferential rim having a diaphragm circumferential rim thickness being greater than the width of the radially inward-opening slot of the first circumferential rim so that the diaphragm circumferential rim is prevented from being pulled through the inward-opening slot during use and is compressed within said circumferential channel of the first circumferential rim so as to form a fluid seal; and
    a retaining ring defining an annular channel enclosing said first rim and retaining said first rim against said second rim.

12. The brake actuator assembly of claim 11, wherein said retaining ring includes an exterior radially-oriented hole, said first rim further comprises a plurality of interior radially-oriented holes and further comprising a pin, each of said plurality of interior holes being alignable with said exterior hole such that said pin may be selectively inserted into both said exterior hole and any one of said plurality of interior holes.

13. The brake actuator assembly of claim 11, wherein said pin is one of a spring-loaded pin and a set screw.

14. The brake actuator assembly of claim 13, wherein said retaining ring includes an exterior radially-oriented hole, said first rim comprises a plurality of interior radially-oriented holes and further comprising a pin, each of said plurality of interior holes being alignable with said exterior hole such that said pin may be selectively inserted into both said exterior hole and any one of said plurality of interior holes.

15. The brake actuator assembly of claim 11, wherein said retaining ring is formed integrally with said second rim.

16. The brake actuator assembly of claim 15, wherein said retaining ring includes an exterior radially-oriented hole, said first rim further comprises a plurality of interior radially-oriented holes and further comprising a pin, each of said plurality of interior holes being alignable with said exterior hole such that said pin may be selectively inserted into both said exterior hole and any one of said plurality of interior holes.

17. The brake actuator assembly of claim 16, further comprising a bearing interposed between said first rim and said second rim.

18. The brake actuator assembly of claim 11 further comprising a pin and wherein said retaining ring is adapted to receive the pin.

19. The brake actuator of claim 18 wherein the retaining ring includes a hole adapted to receive the pin.

20. A vehicle having a pneumatically actuated brake assembly including one of a generally cylindrical and a generally frustoconical pneumatic brake actuator comprising a pressure housing; a non-pressure housing; a diaphragm disposed between said pressure housing and said non-pressure housing, said diaphragm having a circumferential rim with a diaphragm circumferential rim thickness; and a retaining ring for retaining said pressure housing against said non-pressure housing wherein said pressure housing includes an inwardly-rolled rim enclosed within said retaining ring and formed to define independently of the non-pressure housing an interior circumferential channel for retaining a circumferential periphery of said diaphragm therein; said circumferential channel having a radially inward-opening slot and the diaphragm circumferential rim thickness being greater than a width of the radially inward-opening slot so that the circumferential rim is prevented from being pulled through the inward-opening slot during use and is compressed within said circumferential channel so as to form a fluid seal wherein said pressure housing and said non-pressure housing may be rotated with respect to each other; and wherein said retaining ring engages said pressure housing to prevent said rotation upon installation of said actuator on said vehicle.

21. The vehicle of claim 20, wherein said retaining ring is formed integrally with said non-pressure housing.

22. The vehicle of claim 20, wherein said retaining ring includes a first radially-oriented hole dimensioned to receive a stop pin having an end and wherein said inwardly-rolled rim further comprises a plurality of radially-oriented holes for receiving said end of said stop pin.

23. The vehicle of claim 22, wherein said stop pin is one of a spring-loaded pin and a set screw.

24. The vehicle of claim 20 further comprising a pin and wherein said retaining ring is adapted to receive the pin.

25. The vehicle of claim 24 wherein the retaining ring includes a hole adapted to receive the pin.

26. A method for installing a pneumatic brake actuator on a vehicle, said vehicle having at least one pneumatic supply conduit, said pneumatic brake actuator being comprised of a pressure housing, a non-pressure housing, a retaining ring for mating said pressure housing and said non-pressure housing against each other and wherein at least one of said pressure housing and said non-pressure housing may be rotated with respect to the other, a diaphragm comprising a circumferential rim having a diaphragm circumferential rim thickness, the diaphragm positioned between the two housings such that two interior chambers are defined within said mated housings, and at least one port configured to be connected to said at least one pneumatic supply conduit, said method comprising the steps of:
rotating said actuator to position said at least one port with respect to said at least one pneumatic supply conduit such that said at least one conduit may be coupled to said at least one port;
fixing an angular position of said pressure housing with respect to said non-pressure housing using the retaining ring;
wherein said pressure housing includes a rim defining a circumferential channel independently of the non-pressure housing, said circumferential channel having a radially inward-opening slot, said diaphragm circumferential rim positioned within the circumferential channel and the diaphragm circumferential rim thickness being greater than a width of the radially inward-opening slot so that the circumferential rim is prevented from being pulled through the inward-opening slot during use and is compressed within said circumferential channel so as to form a fluid seal.

27. The method of claim 26, further comprising a first step of attaching said non-pressure housing to said vehicle, and wherein said step of rotating comprises rotating said pressure housing with respect to said attached non-pressure housing.

28. The method of claim 27, wherein said retaining ring includes a stop pin hole dimensioned to receive a stop pin having an end and wherein said rim comprises a plurality of radially-oriented holes that may be positioned with respect to said stop pin hole for receiving said end of said stop pin.

29. The method of claim 26, wherein said retaining ring is an integral extension of said non-pressure housing.

30. The method of claim 29, further comprising a first step of attaching said non-pressure housing to said vehicle, and wherein said step of rotating comprises rotating said pressure housing with respect to said attached non-pressure housing.

31. The method of claim 30, wherein said retaining ring includes a stop pin hole dimensioned to receive a stop pin having an end and wherein said rim comprises a plurality of radially-oriented holes that may be positioned with respect to said stop pin hole for receiving said end of said stop pin.

32. The method of claim 26 wherein the step of fixing an angular position of said pressure housing with respect to said non-pressure housing is accomplished by inserting a stop pin within a stop pin hole defined in said retaining ring, said stop pin having an end that contacts said pressure housing and prevents further rotation.

33. A pressure chamber for a brake actuator assembly comprising:
a pressure housing having an open end defined by an annular rim, said annular rim adapted to be seated on a rim of a non-pressure housing of the brake actuator assembly;
a diaphragm comprising a circumferential rim having a diaphragm circumferential rim thickness;
said annular rim of the pressure housing independently defining a circumferential channel having a radially inward-opening slot, said diaphragm circumferential rim positioned within the circumferential channel and the diaphragm circumferential rim thickness being greater than a width of the radially inward-opening slot so that the circumferential rim is prevented from being pulled through the inward-opening slot during use and is compressed within said circumferential channel so as to form a fluid seal.

34. The pressure chamber of claim 33 further comprising a spring housing coupled to the pressure housing.

* * * * *